(12) United States Patent
Gerszberg et al.

(10) Patent No.: US 7,805,078 B1
(45) Date of Patent: Sep. 28, 2010

(54) INTEGRATED ELECTRICAL/OPTICAL HYBRID COMMUNICATION SYSTEM WITH REVERTIVE HITLESS SWITCH

(75) Inventors: Irwin Gerszberg, Kendall Park, NJ (US); Jeremiah Okoro, Landing, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 0 days.

(21) Appl. No.: 11/843,908

(22) Filed: Aug. 23, 2007

Related U.S. Application Data

(63) Continuation of application No. 10/735,303, filed on Dec. 12, 2003, now Pat. No. 7,274,876.

(51) Int. Cl.
*H04B 10/00* (2006.01)

(52) U.S. Cl. .................. 398/115; 398/116; 398/118; 398/119; 398/120; 398/128; 398/17; 398/19; 398/22

(58) Field of Classification Search ............ 398/17, 398/19, 23, 24, 52, 115–120, 128; 359/145; 340/825; 250/205
See application file for complete search history.

(56) References Cited

U.S. PATENT DOCUMENTS

| | | | |
|---|---|---|---|
| 4,314,370 A | | 2/1982 | Figol |
| 4,904,993 A | * | 2/1990 | Sato ....................... 340/825.57 |
| 5,442,474 A | * | 8/1995 | Huang et al. ................... 398/52 |
| 5,585,953 A | | 12/1996 | Zavrel |
| 5,949,301 A | * | 9/1999 | Clarke et al. ................. 333/101 |
| 6,016,476 A | | 1/2000 | Maes et al. |
| 6,188,680 B1 | | 2/2001 | Ohki |
| 6,314,163 B1 | * | 11/2001 | Acampora ................... 398/115 |
| 6,763,195 B1 | * | 7/2004 | Willebrand et al. ......... 398/115 |
| 6,889,009 B2 | * | 5/2005 | Willebrand ................. 398/115 |
| 6,952,529 B1 | * | 10/2005 | Mittal .......................... 398/26 |
| 7,116,909 B2 | * | 10/2006 | Aburakawa et al. ......... 398/115 |
| 7,224,706 B2 | * | 5/2007 | Loeffler-Lejeune ......... 370/508 |
| 2002/0075542 A1 | * | 6/2002 | Kumar et al. ................ 359/135 |
| 2002/0109885 A1 | * | 8/2002 | Aburakawa et al. ......... 359/172 |
| 2002/0122230 A1 | * | 9/2002 | Izadpanah et al. ........... 359/145 |
| 2002/0122231 A1 | * | 9/2002 | Verbana et al. ............. 359/145 |
| 2003/0010891 A1 | * | 1/2003 | Mizuhara et al. ............ 250/205 |
| 2004/0208591 A1 | * | 10/2004 | Willebrand et al. ......... 398/115 |

\* cited by examiner

*Primary Examiner*—Li Liu
(74) *Attorney, Agent, or Firm*—Hoffmann & Baron, LLP

(57) ABSTRACT

A system according to embodiments of the invention may include a first communication path that converts an optically-modulated source signal to a radio signal based on a detected degradation in a quality of a received optical signal, and a second communication path that converts a radio-modulated source signal to an optical signal based on a detected degradation in a quality of a received radio signal. The system has the ability to automatically adapt to diverse weather conditions to improve the reliability of a communication link without user intervention while supporting multiple modulation schemes.

14 Claims, 10 Drawing Sheets

INTEGRATED ELECTRICAL/OPTICAL HYBRID COMMUNICATION SYSTEM WITH REVERTIVE HITLESS SWITCH

CROSS-REFERENCE TO RELATED APPLICATION

This application is a continuation of U.S. application Ser. No. 10/735,303, filed Dec. 12, 2003, entitled "Integrated Electrical/Optical Hybrid Communication System with Revertive Hitless Switch", which is a continuation-in-part of U.S. application Ser. No. 10/162,641, filed Jun. 6, 2002, entitled "Integrated Electrical/Optical Hybrid Communication System", the disclosures of which are incorporated herein by reference. U.S. application Ser. No. 10/735,303, filed Dec. 12, 2003 claims the benefit of U.S. Provisional Application Serial No, 60/467,856, filed May 5, 2003, the disclosure of which is incorporated herein by reference.

TECHNICAL FIELD

The present invention relates generally to communication systems, and more particularly to a communication system that automatically switches between optical and electrical transmitting and receiving capabilities to provide a highly reliable communication link in diverse weather conditions without user intervention.

BACKGROUND OF THE INVENTION

Communications systems have seen exponential growth in demand for bandwidth by the large and small business communities. Moreover, businesses demand a high level of availability in communications systems. One known measure of availability which communication service providers strive to sustain is "five nines" availability, wherein a communication link may be down for only a few minutes a year.

Free space optics (FSO) and broadband radio are two technologies that have been proposed to meet the demand for bandwidth. FSO, however, while providing "infinite" bandwidth, has some drawbacks. For instance, fog may disperse the light beam, thereby rendering reception impossible for long haul communication. Accordingly, for five nines availability, FSO is primarily used for short links (less than 1.5 km). In Europe, for example, FSO has been deployed for applications such as short hops.

Broadband radio technology, on the other hand, is not hampered by fog as is FSO, and accordingly is more reliable for long haul communication. However, heavy rain tends to degrade radio performance, FSO performance, by contrast, is not as quickly degraded by heavy rain.

FSO with its infinite bandwidth and low availability in fog is gaining some recognition in some short distance applications where the delivery of high bandwidth is required. All the current FSOC systems utilize ON/OFF key modulation scheme. However, higher capacity systems require higher modulation schemes for improved data throughput and better carrier-to-noise ratio (CNR) beyond what the current technology can offer.

In view of the foregoing considerations, a system is called for to address the growing demand for bandwidth, a high level of availability, better throughput, and improvements in CNR.

SUMMARY OF THE INVENTION

Embodiments of the present invention relate to a "hybrid" communication system that includes a combination of radio and optical elements. The system may comprise a hybrid transmit path that converts an optically-modulated source signal to a radio signal based on a detected degradation in a quality of a received optical signal, and a hybrid transmit path that converts a radio-modulated source signal to an optical signal based on a detected degradation in a quality of a received radio signal. The respective hybrid transmit paths may also function as corresponding hybrid receive paths for received signals. The system may communicate with another system of substantially the same kind to inform the other system when hybrid paths are being used, and to instruct the other system to transmit correspondingly in return.

The system may further comprise optical-only transmit and receive paths, and radio-only transmit and receive paths. The system is therefore able to receive and transmit an optical signal under conditions that are more favorable to the optical signal than to a radio signal, and receive and transmit a radio signal under conditions that are more favorable to the radio signal than to the optical signal. The system is further able to adapt to diverse weather conditions by forming hybrid transmit and receive paths depending on the conditions. For example, in foggy conditions, the system could convert an optically modulated source signal to a radio signal and transmit the radio signal, and instruct another system to transmit a radio signal in return. Thus, communication between the two systems would be via radio signals, which are not adversely affected by fog in a significant way. Alternatively, in heavy rain, the system could convert a radio-modulated source signal to an optical signal and transmit the optical signal, and instruct another system to transmit an optical signal in return. Thus, communication between the two systems would be via optical signals, which are not adversely affected by heavy rain in a significant way. Accordingly, a communication link that uses the system may be reliably maintained.

Another embodiment of the invention overcomes the disadvantages of the prior art by providing multi-level modulation for high capacity applications, improved system CNR, and an improvement in system availability from the current three nines to five nines. Integration of a revertive hitless switch, in adverse climatic conditions, automatically selects the mode with a better CNR for continued system operation. When the impairment is no longer present, the switch automatically reverts to its default mode of operation without user intervention.

Other objects and features of the present invention will become apparent from the following detailed description considered in conjunction with the accompanying drawings. It is to be understood, however, that the drawings are designed as an illustration only and not as a definition of the limits of the invention.

DETAILED DESCRIPTION

Figure 1:
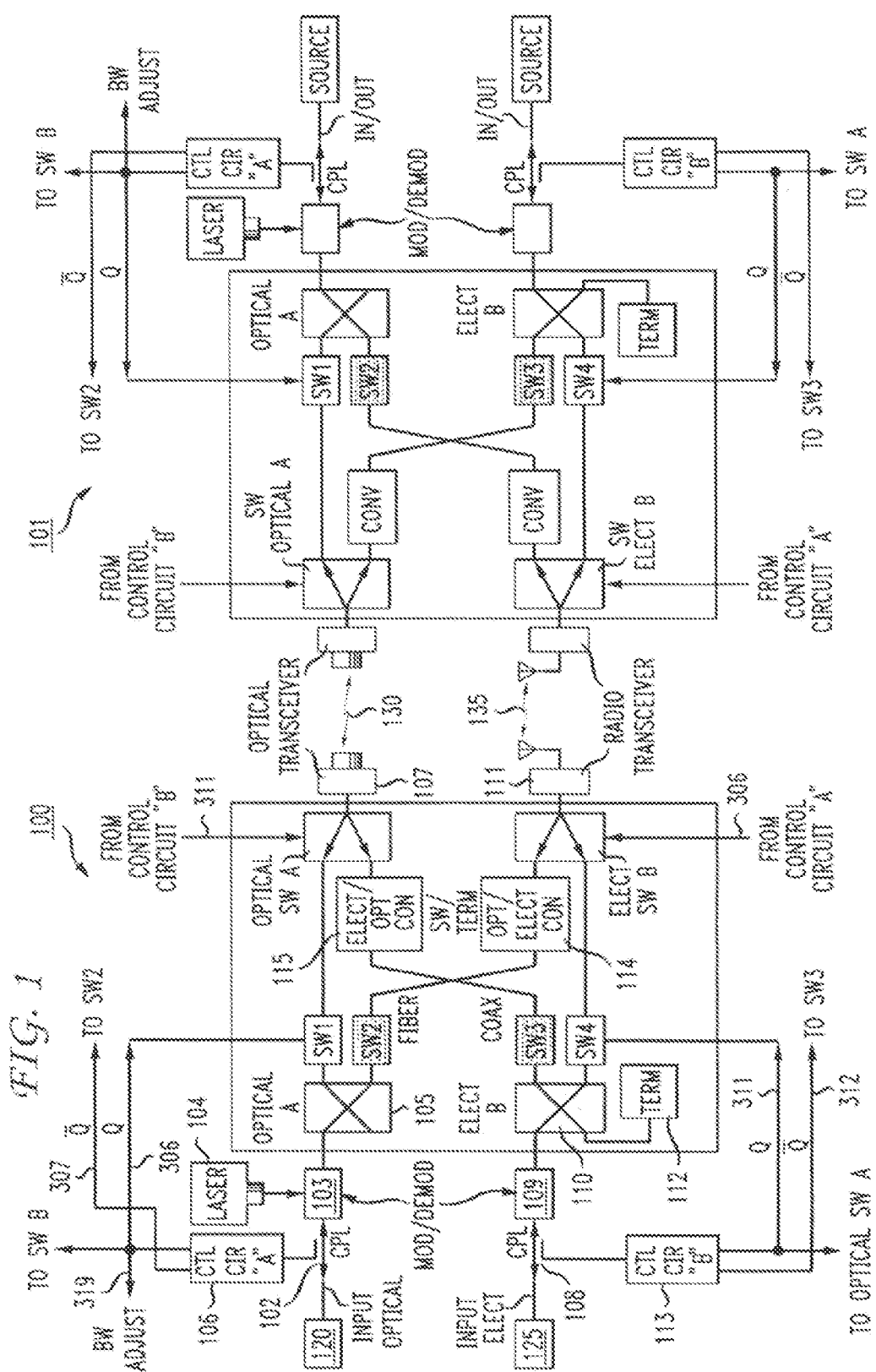
FIG. 1 shows a hybrid radio/optical communication system according to embodiments of the invention.

FIG. 1 shows a communication apparatus according to embodiments of the invention. The apparatus may comprise a system 100 and a system 101 that may communicate with each other. System 100 and system 101 may be substantially identical, and therefore only system 100 will be discussed in detail. In an overall communication network setting, system 100 and system 101 could differ from each other in that one system could have control over some operations of the other system. For example, system 100 could be a "local" or "control" system while system 101 was a "remote" system having some aspects of its operations controlled by system 100.

System 100 may be configured to receive and transmit both optical signals and radio signals. System 100 may provide transmit and receive communication paths that are optical-only, radio-only, or a "hybrid" of optical and radio. More particularly, system 100 may provide a transmit path for a source signal that is optically modulated and transmitted using optical transmitting equipment, and may provide a transmit path for a source signal that is radio modulated (i.e., uses radio modulation) and is transmitted using radio transmitting equipment. On the other hand, if a degradation in a quality of a received optical signal is detected, a transmit path through system 100 for the optically-modulated source signal may be formed which originates in optical modulating equipment but subsequently uses radio transmitting equipment, creating a hybrid optical-to-radio transmit path. Alternatively, if a degradation in a quality of a received radio signal is detected, a transmit path through system 100 for the radio-modulated source signal may be formed which originates in radio modulating equipment but subsequently uses optical transmitting equipment, creating a hybrid radio-to-optical transmit path. The hybrid transmit paths thus formed may also function as corresponding hybrid receive paths.

System 100 may comprise a coupler 102 that connects a source 120 to an optical modulator/demodulator 103. Source 120 could provide voice, data, or video, for example. Modulator/demodulator 103 may include a telemetry circuit via which a "handshake" comprising control and status signals may be exchanged with system 101. A received optical signal may also be coupled by coupler 102 to a control circuit 106 for detecting degradation in a quality of the received optical signal and causing a hybrid optical-to-radio transmit path to be formed in response, as discussed in more detail below. Modulator/demodulator 103 optically modulates a laser 104 with source signal 120. The modulated signal may then be input to an optical signal splitter 105 which splits the modulated signal into two separate identical signals, forming a first output and a second output of the optical signal splitter 105. Optical signal splitter 105 may comprise mirrors. The mirrors may, for example, be discrete mirrors, or be fabricated on a GaAs substrate using microwave monolithic integrated circuit (MMIC) technology.

The first output of optical signal splitter 105 may be input to a first switch, SW1, and the second output of optical signal splitter 105 may be input to a second switch, SW2. Typically, under circumstances which are more favorable to communication via an optical signal than to communication via radio, SW2 would be open and SW1 would be closed. Control circuit 106 may control which of SW1, SW2 is open, and which is closed. SW1 and SW2 may be non-reflective switches.

The output of SW1 may be connected to a first input of an optical switch, SW A. SW A may be a single-pole-double-throw optical switch. The output of SW A may be connected to an optical transceiver 107 for transmitting or receiving an optical signal. The output of SW2 may be connected to an optical-to-electrical signal converter 114 for converting an optical signal to a radio signal. Optical-to-electrical signal converter 114 may also function as an electrical-to-optical signal converter for a received radio signal. The connection of SW2 to optical-to-electrical signal converter 114 may be via an optical fiber medium. Optical-to-electrical signal converter 114 may be connected to a first input of an electrical switch, SW B. SW B may be a single-pole-double-throw electrical switch. The output of SW B may be connected to a radio transceiver 111 for transmitting or receiving a radio signal.

System 100 may further comprise a coupler 108 that connects a source 125 that provides, e.g., voice, data or video, to a radio modulator/demodulator 109. A received radio signal may also be coupled by coupler 108 to a control circuit 113 for detecting degradation in a quality of the received radio signal and causing a hybrid radio-to-optical transmit path to be formed in response, as discussed in more detail below. The modulated signal from modulator/demodulator 109 may be input to a radio signal splitter 110 which splits the modulated signal into two separate identical signals, forming a first output and a second output of the radio signal splitter 110. Radio signal splitter 110 may be a 90-degree splitter.

The first output of radio signal splitter 110 may be input to a third switch, SW3, and the second output of radio signal splitter 110 may be input to a fourth switch, SW4. Typically, under circumstances which are more favorable to communication via radio than to communication via an optical signal, SW3 would be open and SW4 would be closed. SW3 may be coupled to a terminator 112 to prevent reflections back to the input source. Control circuit 113 may control which of SW3, SW4 is open, and which is closed. SW3 and SW4 may be non-reflective switches.

The output of SW3 may be connected to an electrical-to-optical signal converter 115 for converting a radio signal to an optical signal. Electrical-to-optical signal converter 115 may also function as an optical-to-electrical signal converter for a received optical signal. The connection of SW3 to electrical-to-optical signal converter 115 may be via a coaxial cable. Electrical-to-optical signal converter 115 may be connected to a second input of SW A. The output of SW4 may be connected to a second input of SW B.

Reference numeral 130 represents optical signals being transmitted and received by optical transceiver 107 and an optical transceiver of system 101. Reference numeral 135 represents radio signals being transmitted and received by radio transceiver 111 and a radio transceiver of system 101. A received optical signal may travel one of the communication paths described above, but in the opposite direction from a transmitted source signal. That is, a received optical signal could travel an optical-only receive path or a hybrid optical-to-radio receive path, depending on the states of switches SW A, SW B and SW1-SW4. For example, in an optical-only receive path, SW1 could be closed, SW2 could be open, and SW A could be connected to SW1. In this arrangement, a received optical signal would travel from optical transceiver 107 through SW A, SW1, and optical signal splitter 105, to be demodulated by optical modulator/demodulator 103. The demodulated signal would then be coupled by coupler 102 to control circuit 106, which may be configured to detect degradation in a quality of the received optical signal and cause a hybrid optical-to-radio transmit path to be formed in response, as discussed in more detail below.

On the other hand, SW2 could be closed, SW1 could be open, and SW B could be connected to optical-to-electrical converter 114 to form a hybrid radio-to-optical receive path. In this arrangement, a received radio signal would travel from radio transceiver 111 through SW B, and be converted to an optical signal by converter 114. The converted received signal would then travel through SW 2 and splitter 105 to be demodulated by modulator/demodulator 103. The demodulated signal would then be coupled by coupler 102 to control circuit 106 to detect degradation in a quality of the received radio (now converted to optical) signal.

Symmetrically, a received radio signal could travel a radio-only receive path or a hybrid optical-to-radio receive path, depending on the statuses of switches SW A, SW B and SW1-SW4. For example, in a radio-only receive path, SW4 could be closed, SW3 could be open, and SW B could be connected to SW4. In this arrangement, a received radio signal would travel from radio transceiver 111 through SW B, SW4, and radio signal splitter 110, to be demodulated by radio modulator/demodulator 109. The demodulated signal would then be coupled by coupler 108 to control circuit 113, which may be configured to detect degradation in a quality of the received radio signal and cause a hybrid radio-to-optical transmit path to be formed in response, as discussed in more detail below.

On the other hand, SW3 could be closed, SW4 could be open, and SW A could be connected to electrical-to-optical converter 115 to form a hybrid optical-to-radio receive path. In this arrangement, a received optical signal would travel from optical transceiver 107 through SW A, and be converted to a radio signal by converter 115. The converted received signal would then travel through SW 3 and splitter 110 to be demodulated by modulator/demodulator 109. The demodulated signal would then be coupled by coupler 108 to control circuit 113 to detect degradation in a quality of the received optical (now converted to radio) signal.

Figure 3:
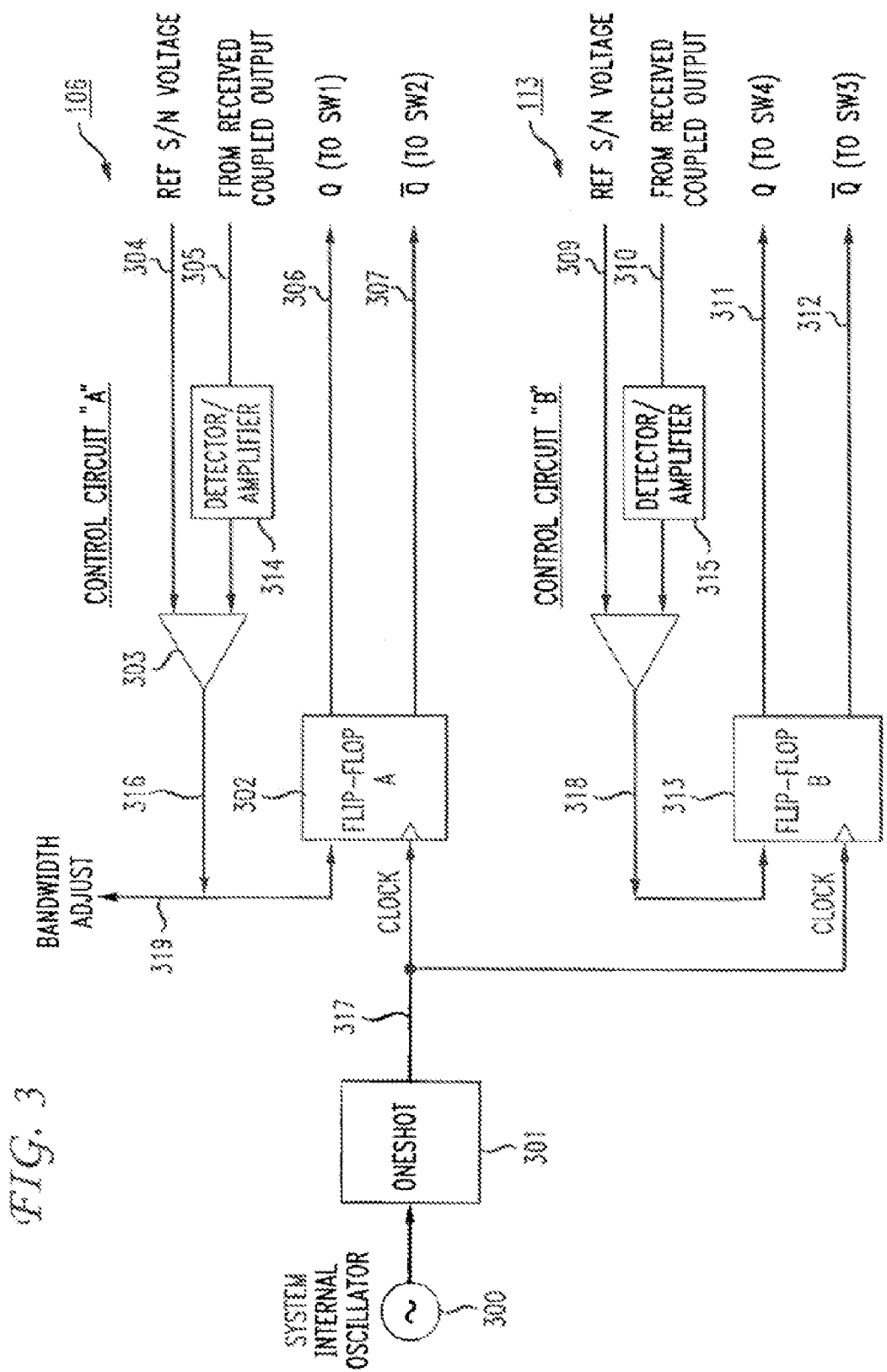
FIG. 3 shows detail of a control circuit according to embodiments of the invention.

FIG. 3 shows details of one possible embodiment of a circuit that could be used to implement control circuits 106 and 113 for detecting degradation in a received optical signal and a received radio signal, respectively, and causing a corresponding hybrid transmit/receive path to be formed in response. For example, control circuit 106 (arbitrarily designated "A" for purposes of illustration) could comprise a comparator 303 which outputs a signal 316. Inputs to comparator 303 could include a reference signal-to-noise (S/N) voltage signal 304 and received optical signal 305, coupled to control circuit 106 by coupler 102 as shown in FIG. 1. The received optical signal 305 could be processed by a detector/amplifier 314 before being input to the comparator 303. The signal 316 could be input to a flip-flop 302 with outputs Q 306 and /Q (Q complement) 307. As shown in FIG. 1, Q 306 may be connected to switch SW1 and /Q 307 may be connected to switch SW2. Thus, a change in state of Q 306 and /Q 307 could, for example, cause switch SW1 to open and switch SW2 to close, or vice versa. Also, as shown in FIG. 1, Q 306 could be input to SW B so that a change in state of Q 306 could cause SW B to select a different input. Flip-flop 302 could also have a clock input 317, generated by a system internal oscillator 300 coupled to a one-shot circuit 301 for adjusting the clock pulse width and to maintain lossless data switching The signal 316 could indicate degradation in the quality of received optical signal 305. That is, if the received optical signal 305 level is greater that the reference signal-to-noise (S/N) voltage signal level 304, the quality of received optical signal 305 could be considered to be acceptable. On the other hand, if the received optical signal 305 is less than the reference signal-to-noise (S/N) voltage signal level 304, the quality of received optical signal 305 could be considered to be unacceptable.

If the level of the received optical signal 305 and reference signal-to-noise (S/N) voltage signal 304 are equal, the comparator output does not toggle, and no switching takes place. Switching can only take place when the reference threshold of the comparator is crossed. While the received signal level 305 is equal to or slightly greater than the reference threshold of the comparator, the clock input 317 would not cause any change in the Q 306 and /Q 307 outputs of flip-flop 302. Assuming that SW1 was closed, SW2 was open, and that SW A was connected to SW1, system 100 would provide optical-only transmit and receive paths for source 120 and for received input signal 305, respectively.

On the other hand, the quality of received optical signal 305 could be degraded to the extent that the received optical signal level 305 is less than the reference signal-to-noise (S/N) voltage signal level 304, the signal 316 would change from the equivalent of a logic "0" to the equivalent to a logic "1" when input to flip-flop 302. In that event, the values of Q 306 and /Q 307 would "flip"; be reversed, causing switch SW1 to open, switch SW2 to close and SW B to select the input from optical-to-electrical signal converter 114. By closing SW2, the output of optical modulator/demodulator 103 would be converted to a radio signal by optical-to-electrical signal converter 114 and transmitted by radio transceiver 111. At substantially the same time, system 100 would exchange a handshake with system 101, i.e., exchange pre-arranged telemetry signals with system 101. The handshake would inform system 101 that system 100 had formed a hybrid optical-to-radio transmit path for source 120 and instruct system 101 to stop transmitting optical signals to system 100 and instead begin transmitting radio signals to system 100. The hybrid optical-to-radio transmit path formed by system 100 would also function as a hybrid radio-to-optical receive path for a received radio signal from system 101. Therefore, based on the handshake, system 101 would begin transmitting a radio signal to system 100, for example, by forming a hybrid optical-to-radio transmit path or a radio-only transmit path. The paths thus formed by system 101 would also function as receive paths for the radio signals now being transmitted by system 100.

Control circuit 106 could further include a bandwidth adjust signal 319 for adjusting the bandwidth of the radio signal, in the event that the optical data source has a bandwidth or capacity that is greater than the bandwidth or capacity of the radio/antenna.

Control circuit 113 (arbitrarily designated "B" for purposes of illustration) may be symmetrical to control circuit 106. Control circuit 113 could comprise a comparator 308 which outputs the signal 318. Inputs to comparator 308 could include a reference signal-to-noise (S/N) voltage signal 309 and a received radio [input] signal 310, coupled to control circuit 113 by coupler 108 as shown in FIG. 1. Received radio signal 310 could be processed by a detector/amplifier 315 before being input to comparator 308. The signal 318 could be input to a flip-flop 313 with outputs Q 311 and /Q 312. As shown in FIG. 1, Q 311 may be connected to switch SW4 and /Q may be connected to switch SW3. Thus, a change in state of Q 311 and /Q 312 could, for example, cause switch SW4 to open and switch SW3 to close, or vice versa. In addition, as shown in FIG. 1, Q 311 could be input to SW A so that a change in state of Q 311 could cause SW A to select a different input. Flip-flop 313 could also have clock input 317.

The signal 318 could indicate degradation in the quality of received radio signal 310. In the event of such a degradation, a change in the transmit path for source 125 could be effected to switch from a radio-only path and to instead use a hybrid radio-to-optical path of the system 100. That is, upon the signal 318 changing to an extent that an unacceptable level of radio signal degradation has occurred, the Q 311 and /Q 312 outputs of flip-flop 313 may change states. Assuming that SW4 had been closed, SW3 had been open and SW B had the input from SW4 selected before the change in state, by closing SW3 and causing SW A to select the input from electrical-to-optical converter 115, the output of radio modulator/demodulator 109 would be converted to an optical signal by electrical-to-optical signal converter 115 and transmitted by optical transceiver 107. At substantially the same time, system 100 would exchange a telemetry handshake with system 101 to cause system 101 to adapt accordingly. The hybrid radio-to-optical transmit path formed by system 100 would also function as a hybrid optical-to-radio receive path for a received optical signal from system 101. Thus, based on the handshake, system 101 would begin transmitting a radio signal to system 100, for example, by forming a hybrid radio-to-optical transmit path or an optical-only transmit path. The paths thus formed by system 101 would also function as receive paths for the optical signals now being transmitted by system 100.

Clearly, in view of the above-described embodiments, if following a switch from either an optical-only path to a hybrid optical-to-radio transmit path and corresponding hybrid radio-to-optical receive path, or from a radio-only to a hybrid radio-to-optical transmit path and corresponding hybrid optical-to-radio receive path, received signal quality improved to the point that it was no longer below the predetermined threshold level, a switch could be performed back from the respective hybrid paths to either an optical-only path or a radio-only path.

Figure 6:
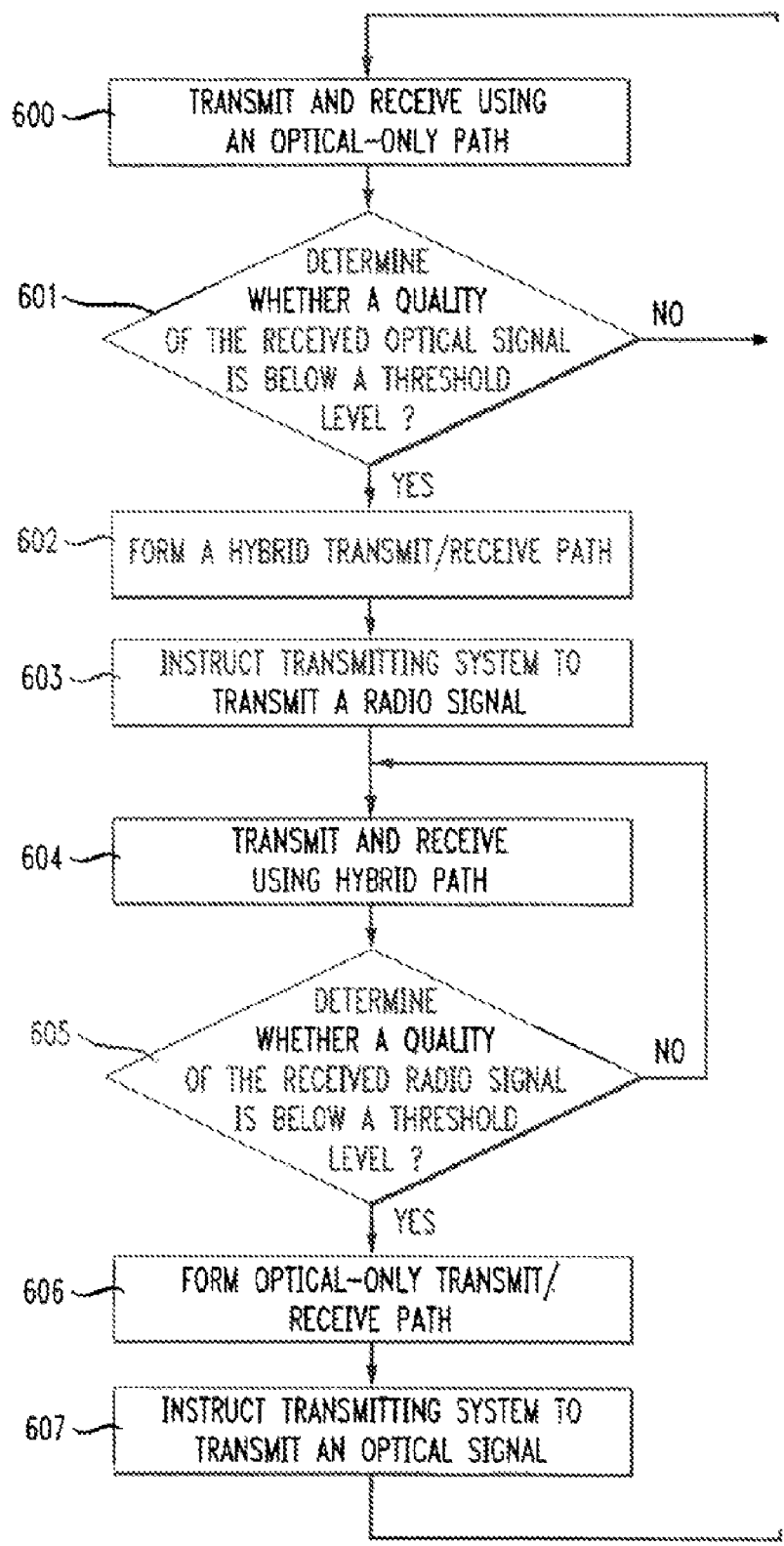
FIG. 6 shows a process flow according to embodiments of the invention.

FIG. 6 shows a process flow according to embodiments of the invention. Assume, initially, an optically modulated source signal transmitted by first system according to embodiments of the invention, and an optical signal received by the first system from a second system according to embodiments of the invention. As shown in block 600, a first system may transmit the source signal to the second system using an optical-only transmit path, and receive the optical signal from the second system using an optical-only receive path. The first system may monitor a quality of the received optical signal, to determine whether the quality of the received optical signal is below a predetermined threshold level, as shown in block 601.

If the result of the determination of block 601 is that the quality of the received optical signal is not below the predetermined threshold level, the first system may continue to transmit and receive using an optical-only path. On the other hand, if the result of the determination of block 601 is that the quality of the received optical signal is below the predetermined threshold level, the first system may form a hybrid transmit path, as described above, for the source signal that converts the source signal into a radio signal which is transmitted to the second system, as shown in block 602. The transmit path thus formed may also function as a corresponding hybrid receive path for a radio input signal, as described above. At substantially the same time, the first system may instruct the second system to stop transmitting an optical signal to the first system and instead transmit a radio signal to the first system, as shown in block 603.

The first system may then transmit and receive using the hybrid path for a period of time, as shown in block 604. The first system may monitor a quality of the received radio signal, to determine whether the quality of the received radio signal is below a predetermined threshold level, as shown in block 605. If the result of the determination of block 605 is that the quality of the received radio signal is not below the predetermined threshold level, the first system may continue to transmit and receive using an optical-only path. On the other hand, if the result of the determination of block 605 is that the quality of the received radio signal is below the predetermined threshold level, the first system may again form a transmit path for the source signal that is optical-only, as shown in block 606. At substantially the same time, the first system may instruct the second system to stop transmitting a radio signal to the first system and instead transmit an optical signal to the first system, as shown in block 606. The first system may then transmit and receive using an optical-only path for a period of time. The foregoing process may be repeated a plurality of times.

A completely parallel process to the process described above could be performed, of course, initially assuming a radio-modulated source signal transmitted by a first system, and a radio signal received by the first system from a second system. Further, in response to the instructions from the first system, the second system may also form hybrid transmit and receive paths, or change from hybrid paths back to optical-only or radio-only paths.

In view of the above-described structures and processes, a system and method according to embodiments of the invention enable a highly reliable communication link that is adaptable to diverse weather conditions. For example, a first system and a second system according to embodiments of the invention might both have optically modulated sources, and exchange optical signals for a period of time. Then, due to changing weather conditions (for example, the occurrence of heavy fog), the first system might detect degradation in the quality of its received optical signal. Accordingly, the first system would form a hybrid optical-to-radio transmit path for its source, and at substantially the same time, instruct the second system to do the same. The hybrid optical-to-radio transmit paths thus formed would also function as corresponding hybrid radio-to-optical receive paths. The first and second systems might then transmit and receive via radio signals for a time. The respective optically modulated sources of the first and second systems would not be affected by the formation of the hybrid paths.

Then, possibly, due to changing weather conditions (for example, the occurrence of heavy rain), the quality of the radio signals exchanged by the first and second systems could degrade. In that event, the first system could switch back to optical-only transmit and receive paths, and instruct the second system to do the same. The first and second systems might then transmit and receive via optical signals for a time, until the quality of the optical signals degraded again, and so on.

A completely parallel process to that described in the foregoing is also readily envisaged, assuming a first system and a second system according to embodiments of the invention both having radio-modulated sources. However, the first and the second systems need not necessarily have like sources. For example, a first system could have a source that was optically modulated, while a second system could have a source that was radio-modulated. By means of a suitable handshake, i.e., by an exchange of pre-arranged telemetry signals between the first system and the second system, either system could be caused to form a suitable hybrid path to communicate with the other system. For example, the first system could form a hybrid optical-to-radio transmit path and corresponding hybrid radio-to-optical receive path, while the second system utilized radio-only transmit and receive paths. Alternatively, the first system could utilize optical-only transmit and receive paths while the second system could form a hybrid radio-to-optical transmit path and corresponding hybrid optical-to-radio receive path. Of course, the foregoing permutations could also be realized with the roles of the first and second systems reversed.

Figure 2:
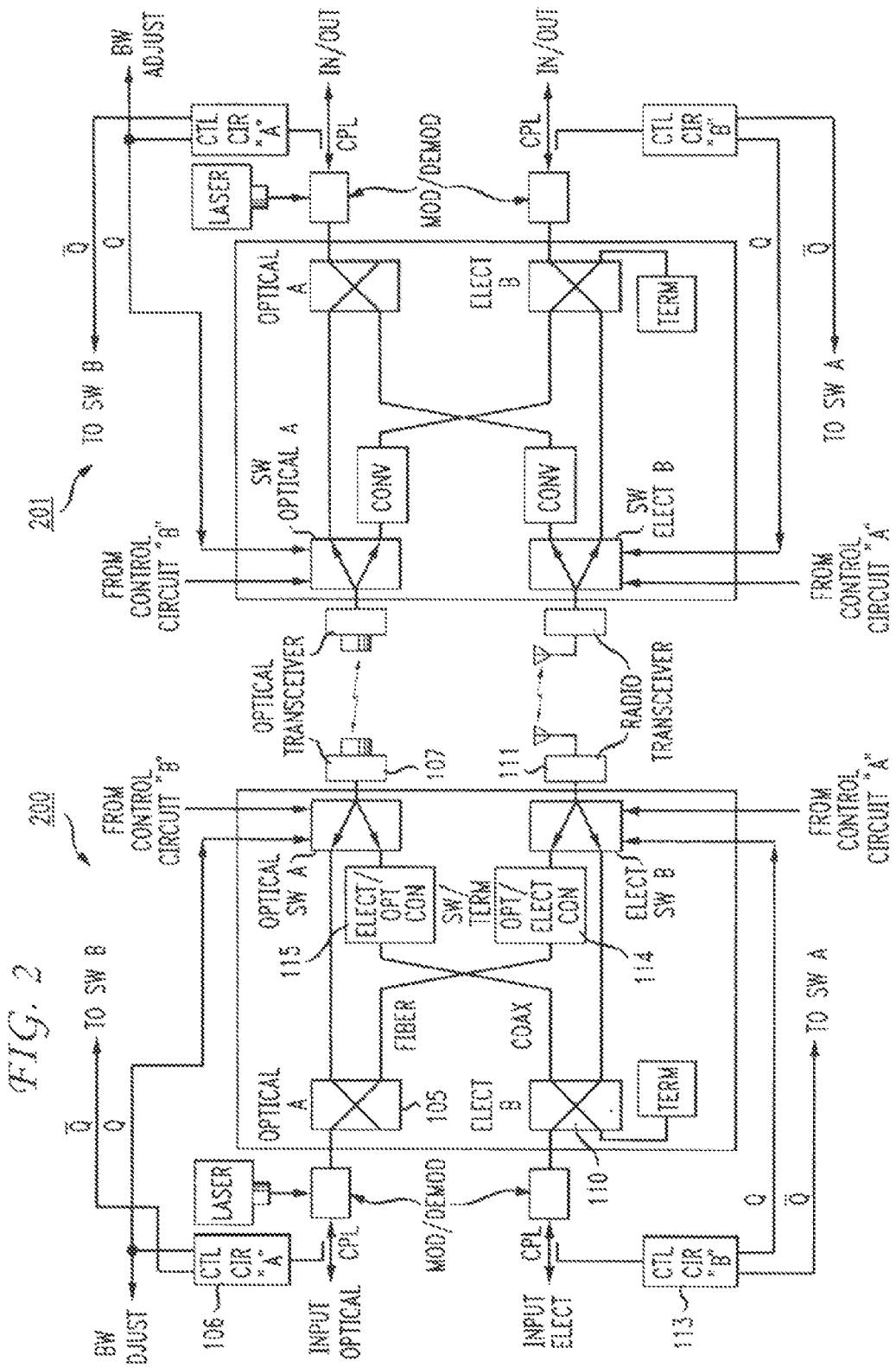
FIG. 2 shows another possible embodiment of a hybrid radio/optical communication system according to the invention.

FIG. 2 shows alternative embodiments to systems 100 and 101. FIG. 2 shows systems 200 and 201 which are identical to systems 100 and 101, respectively, except that switches SW1, SW2, SW3, and SW4 are not included. Instead, the Q and /Q signals from control units 106 and 113 may be coupled directly to switches SW A and SW B. The Q and /Q signals may control whether SW A will receive an "unconverted" optical signal directly from optical signal splitter 105, or whether SW A will received a "converted" optical signal; i.e., a signal which has been converted from a radio signal to an optical signal by electrical-to-optical converter 115. Symmetrically, the Q and /Q signals may control whether SW B will receive an "unconverted" radio signal directly from radio signal splitter 110, or whether SW B will received a "converted" radio signal; i.e., a signal which has been converted from an optical signal to a radio signal by optical-to-electrical converter 114. Depending on which of SW A and SW B is currently carrying the input signal, the transceiver connected to the other switch may be placed in a stand-by mode. That is, if SW A is currently carrying the input signal, radio transceiver 111 may be placed in stand-by mode, and if SW B is currently carrying the input signal, optical transceiver 107 may be placed in stand-by mode. By eliminating switches SW1-SW4 as shown in FIG. 2, a system 200 may be constructed more inexpensively, and may operate more reliably.

Figure 4:
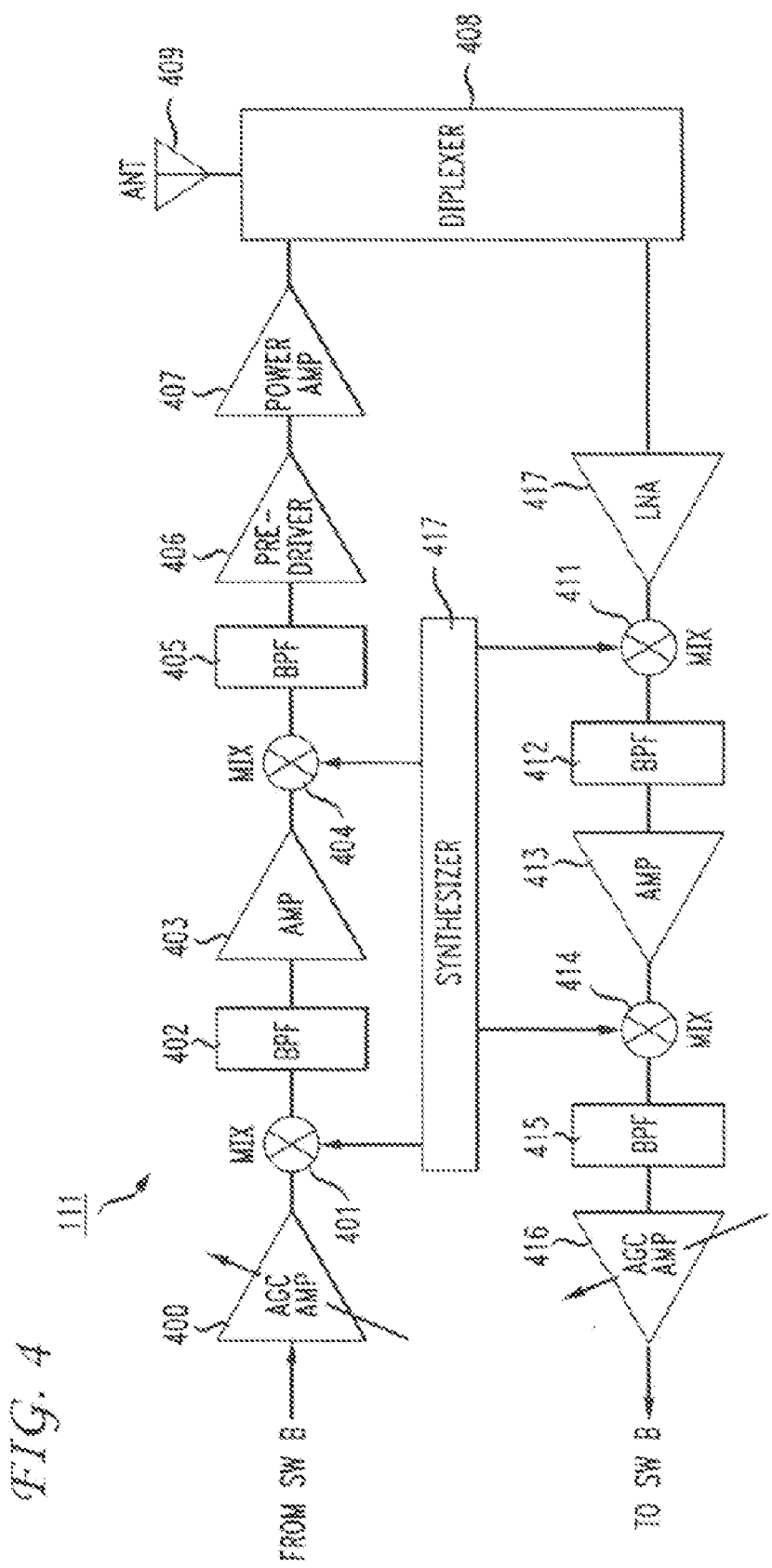
FIG. 4 shows detail of a radio transceiver according to embodiments of the invention.

FIG. 4 shows one possible implementation of radio transceiver 111 according to embodiments of the invention. Radio transceiver 111 may be a standard duplex broadband radio unit. Its transmit path may comprise an AGC (automatic gain control) circuit 400 coupled to a "double conversion front end" comprising a mixer 401 followed by a band-pass filter 402, an amplifier 403, a mixer 404 and a band-pass filter 405. The band-pass filter 405 may be coupled to a pre-driver 406 which is coupled to a power amplifier 407. Power amplifier 407 may be coupled to a diplexer 408 which is in turn coupled to an antenna 409.

Generally, AGC circuit 400 may compensate for losses due to cabling and connectors from SW B. The double conversion front end may translate the IF frequency to the final transmission frequency. Pre-driver 406 and power amplifier 407 amplify the output signal to the desired signal level for over-the-air transmission through antenna 409. Diplexer 408 may contain the transmit band-pass filter for grooming the transmitter output spectrum. Synthesizer 417 may be input to mixers 401 and 405 and may provide local oscillator signals for up-conversion to the desired transmitter frequency.

The receive path of radio transceiver 111 may comprise antenna 409 and diplexer 408, which may contain the receive band-pass filter. Diplexer 408 may be coupled to a low-noise amplifier 410, which may in turn be coupled to a "double conversion down converter" comprising a mixer 411 followed by a band-pass filter 412, an amplifier 413, a mixer 414 and a band-pass filter 415. Band-pass filter 414 may be coupled to an AGC circuit 416 which is input to SW B. AGC circuit 416 may compensate for receiver input variations. Synthesizer 417 may be input to mixers 411 and 414 and provide local oscillator signals for RF frequency down-conversion to an IF signal. The IF signal may be sent via SW B through system 100 for demodulation and data extraction.

According to additional embodiments of the present invention, radio transceiver 111 may further comprise such features as a built-in temperature sensor, a voltage standing wave ratio (vswr) monitor, a receive signal level (RSL) indicator, and a transmit power monitor.

Figure 5:
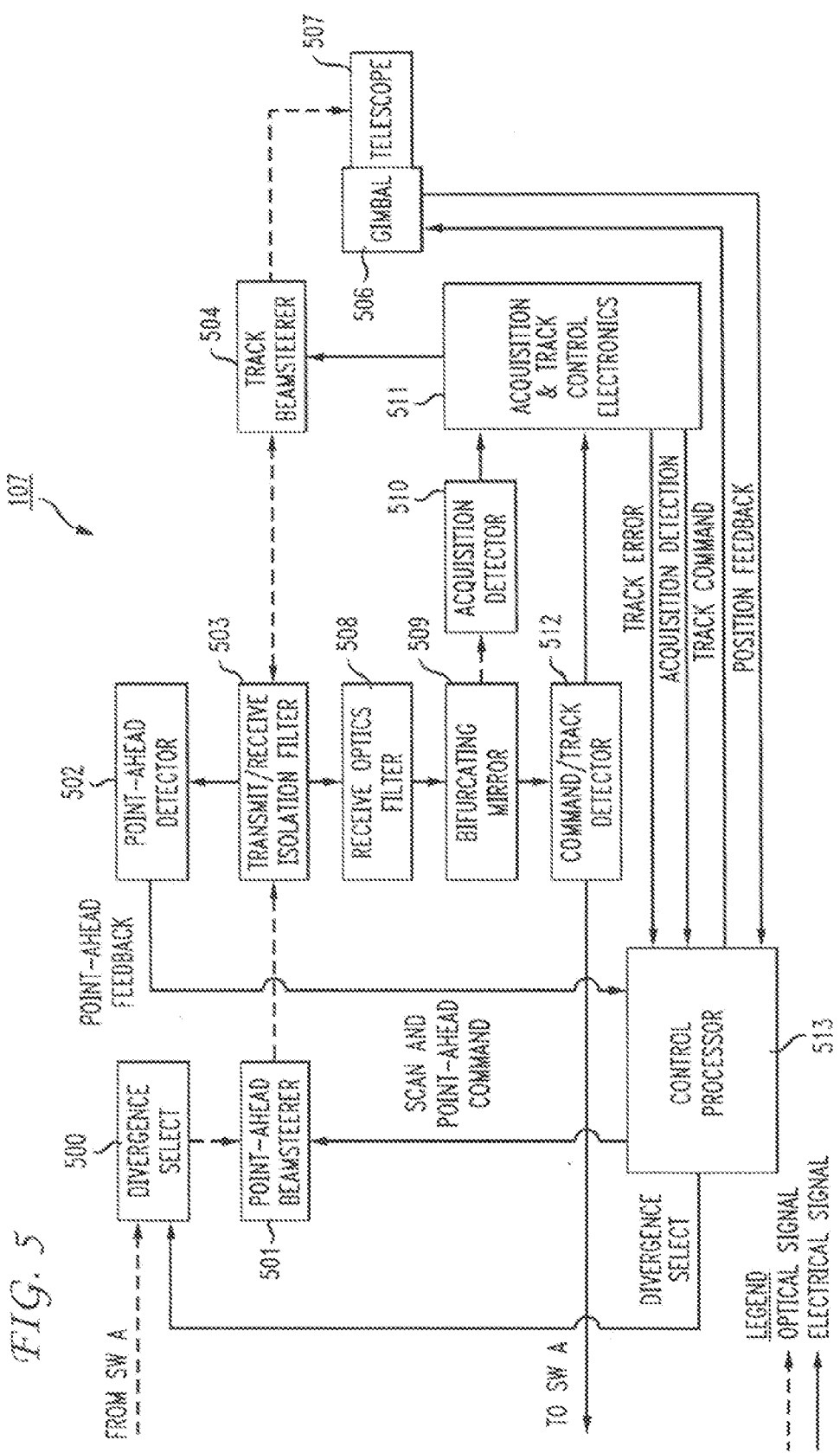
FIG. 5 shows detail of an optical transceiver according to embodiments of the invention.

FIG. 5 shows one possible implementation of optical transceiver 107 according to embodiments of the invention. The transmit path of optical transceiver 107 may comprise a divergence select module 500 followed by a point-ahead beamsteerer 501, a transmit/receive isolation filter 503, a track beamsteerer 504, and a gimbal 506 and telescope 507. The receive path of optical transceiver 107 may comprise telescope 507, followed by track beam steerer 504, transmit/receive isolation filter 503, receive optics filter 508, bifurcating mirror 509, acquisition detector 510, gimbal 506, a command/track detector 512, and acquisition and track control electronics 511. A control processor 513 may control operations of optical transceiver 107 based on input signals such as a position feedback signal from gimbal 506, an acquisition detection signal and a track error signal from acquisition and track control electronics 511, and a point-ahead feedback signal from a point-ahead detector 502. Control processor may output control signals such as a track command signal to gimbal 506, a scan and point-ahead command to point-ahead beamsteerer 501, and a divergence select signal to divergence select module 500.

In a transmit mode of operation, divergence select module 500 may receive an optical input signal from SW A. A divergence select signal from control processor 513 may select a beam divergence. The optical beam may then be directed to transmit/receive isolation filter 503. Track beamsteerer 504 may focus the beam on telescope 507, which may then beam the optical signal to a remote site.

In a receive mode of operation, telescope 507 may receive an optical signal from a remote site, directing it to track beamsteerer 504 and from there to transmit/receive isolation filter 503. The filtered signal may undergo further filtering, and be split into two optical signals. One of the two optical signals may go to command/track detector 512 and the other to acquisition detector 510. The output of command/track detector 512 may be sent via SW B through system 100 for demodulation. The output of acquisition detector 510 may be sent to acquisition and track control electronics 511, which may provide the track error and acquisition detection signals which are fed to control processor 513.

According to embodiments, radio modulation for the source signal may be 16 QAM, 32 QAM, 64 QAM or another type of modulation, such as QPSK. Optical modulation of the source signal may be on/off keying-type modulation or another type of modulation.

In yet another embodiment of the invention, the hybrid modem for free space optic communication (FSOC) and radio includes a revertive hitless switch that provides a methodology to extend the FSOC technology availability from three nines to five nines. The modem also preferably includes a built in modulation flexibility for improved capacity beyond the current technology capability. Applications include high capacity data throughput, voice, and video.

As in the embodiments discussed above, the FSOC and radio are complementary systems. In heavy fog, the FSOC system is adversely affected, but the system fairs well in rain. In heavy rain, the radio link is adversely affected, but the system fairs well in fog. This complementary behavior is exploited to improve the FSOC and radio link performance in adverse climatic conditions by integrating FSOC and millimeter wave radio in a parallel architecture, such that, when one of the complementary system fails due to adverse climatic conditions, the system which is not affected by the prevailing weather conditions continues to function to provide services to the end users.

The revertive hitless switch incorporated in this embodiment of the system makes it possible to switch in the FSOC mode or switch in the radio mode. The switching is preferably hitless or automatic, and since the clock source controls the switching action, there is no error or data loss due to a transfer from one mode to the other. The hitless switch is also preferably revertive. When the prevailing weather conditions or impairment is no longer present, the switch preferably returns to its initial default mode of operation. This feature eliminates the need for user intervention since the system incorporates the intelligence to reset itself.

The FSOC/radio modem formed in accordance with the present invention preferably includes a flexible modulation feature that enables for ON/OFF Key, PSK, QAM, and other forms of modulation schemes that the user desire to implement. The multiple modulation feature increases system capacity and improves the system carrier to noise ratio (CNR) parameter, as well as providing a much higher throughput beyond that which conventional technology offers.

The modem formed in accordance with this embodiment of the present invention incorporates a revertive hitless switch that, under adverse climatic conditions, selects the mode (optical or electrical) that provides the better carrier-to-noise (CNR) for continued system operation. When the impairment goes away, the switch automatically returns to its initial default operation mode without error or loss of data due to switching. An oscillator, which provides a system clock preferably ensures system synchronization.

Figure 7:
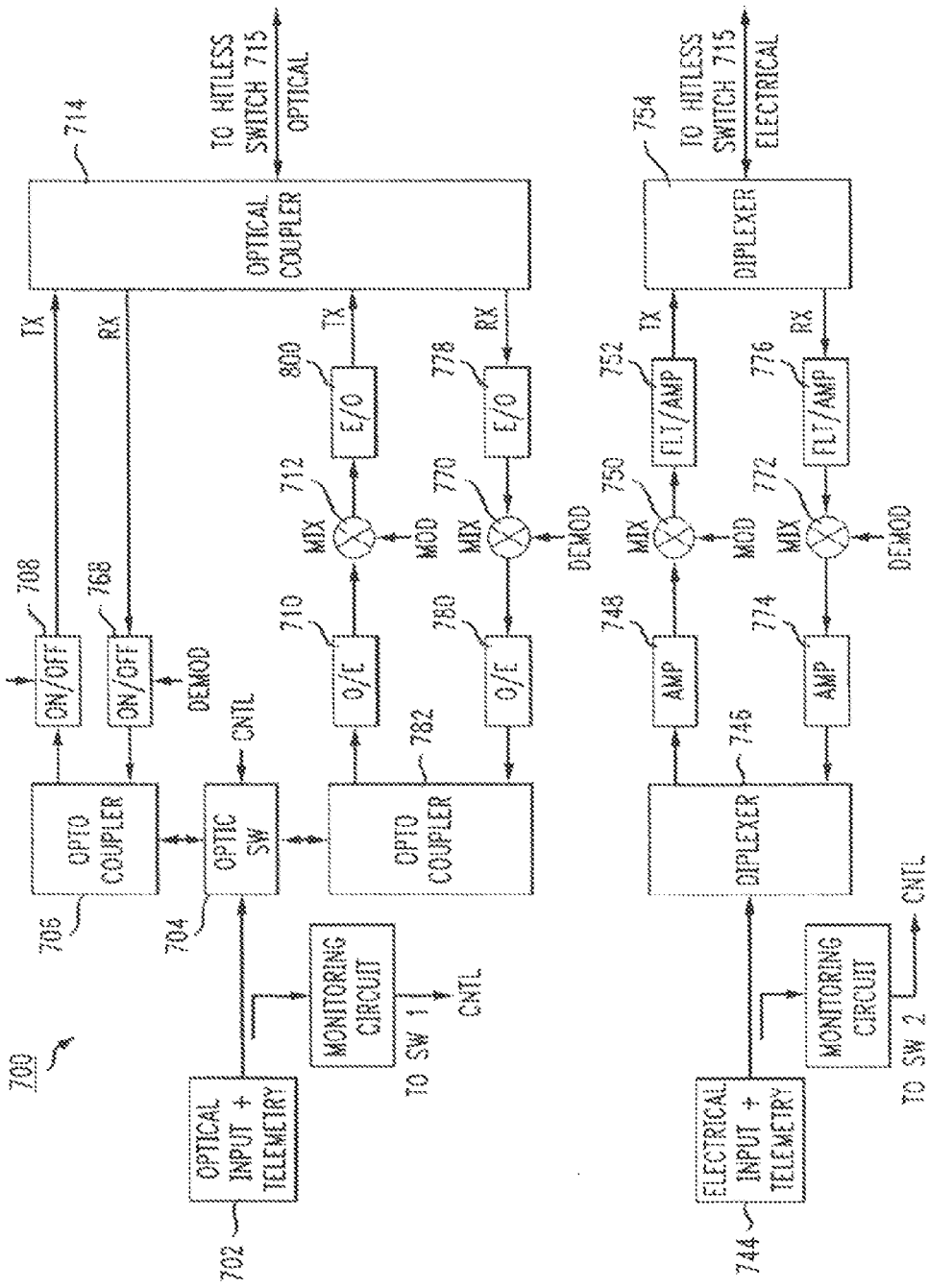
FIG. 7 shows a block diagram of an embodiment of the hybrid free space optical communication (FSOC)/radio modem formed in accordance with the present invention.

This embodiment of the hybrid FSOC/Radio modem is shown in FIG. 7. The revertive hitless switch integrated with the modem is shown is FIG. 9. An optical-to-electrical converter is shown in FIG. 10A and an electrical-to-optical converter is shown in FIG. 10B. The FSOC/Radio modem is preferably used in any time division multiple access (TDMA), code division multiple access (COMA), frequency division multiple access (FDMA), and orthogonal frequency division multiplexing (OFDM) system.

FSOC with its infinite bandwidth and low availability in fog is gaining recognition in short distance applications where the delivery of high bandwidth is required. The majority of current FSOC systems utilize ON/OFF key modulation schemes. Higher capacity systems require higher modulation scheme, such as PSK and QAM. This embodiment overcomes the drawbacks of the prior art by incorporating multi-level modulation schemes for high capacity data throughput and better CNR beyond that which the current technology is able to offer. The flexible modulation scheme enables an increase in data throughput and better CNR for improved video and voice quality.

Improvement in FSOC link availability from three nines to five nines requires an architecture in which the FSOC and radio are paralleled together. There are two modes of operation in this embodiment: the optical mode and the electrical mode. The FSOC and radio are preferably integrated with a hitless revertive switch, which in adverse climatic conditions, is capable of automatically detecting an impairment and selecting that mode that has the better CNR for continued system operation. No error or loss of data is incurred due to mode switching. When the impairment is no longer present, the switch automatically reverts to its default operation mode.

An oscillator preferably provides a clock source that controls the switches to ensure system synchronization. Thus, this embodiment of the present invention exploits the complementary attributes of optical and electrical modes while providing five-nine availability and higher capacity than the current technology is able to offer in adverse climatic conditions.

As shown in FIG. 7, in the optical mode, an unmodulated optical signal and a telemetry signal 702 are preferably injected into an optical input for transmission. An optical switch 704 ultimately routes the optical signal to an ON/OFF switch 708 for ON/OFF key modulation or to an optical-to-electrical converter 710, and a mixer 712, where the resultant electrical signal is PSK or QAM modulated. Alternative modulation schemes are also intended to be within the scope of the present invention.

Figure 9:
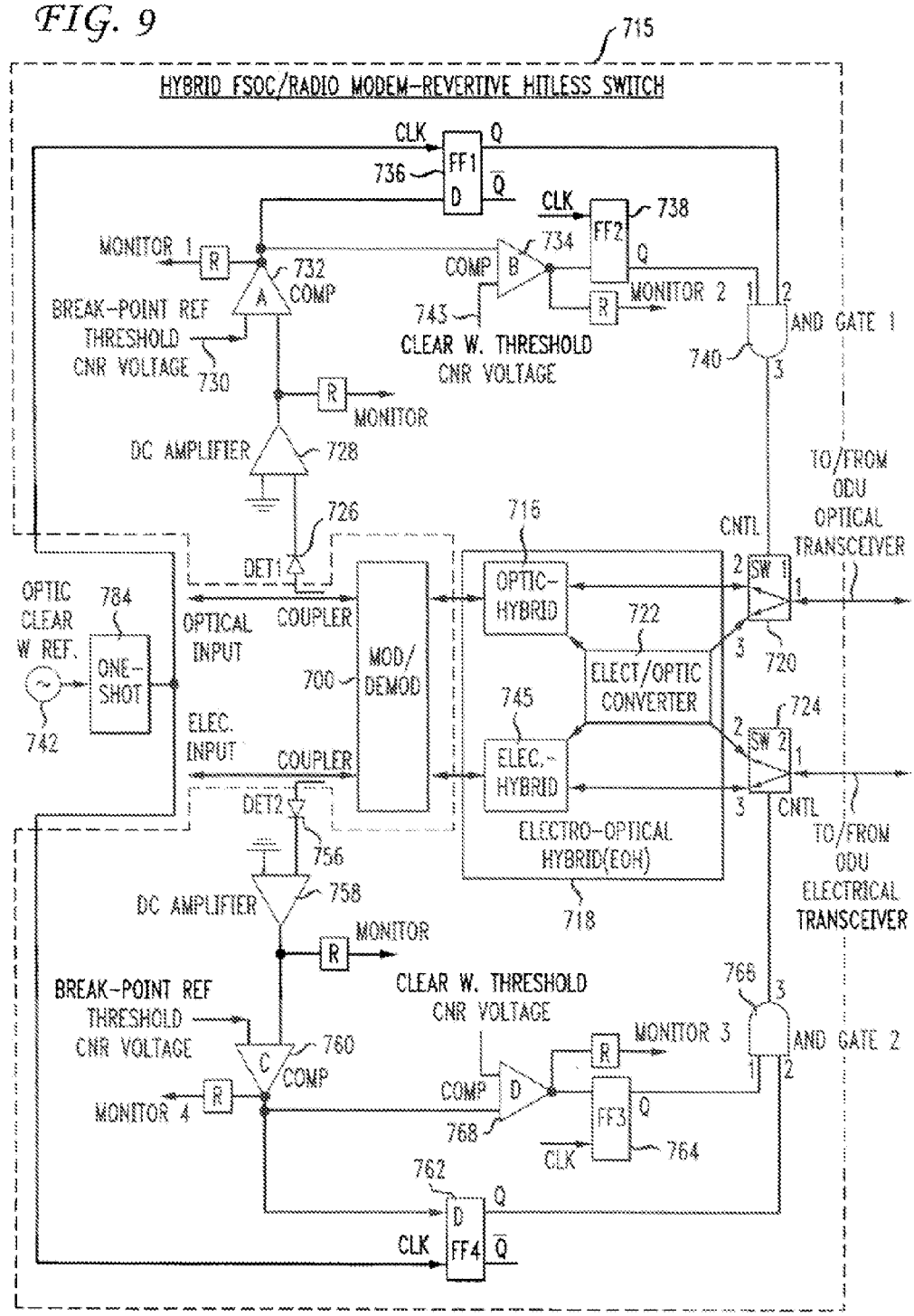
FIG. 9 shows a block diagram of a revertive hitless switch integrated with the modem shown in FIG. 7.
Figure 10A:
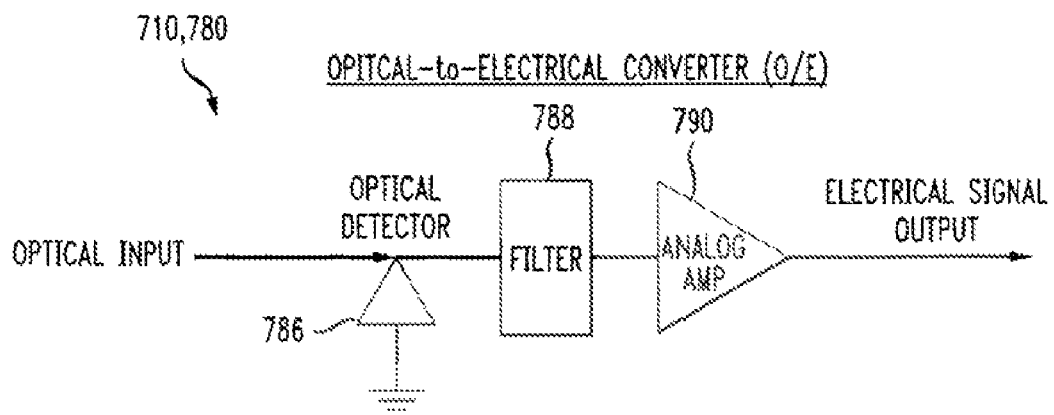
FIG. 10A shows a block diagram of an optical-to-electrical converter.
Figure 10B:
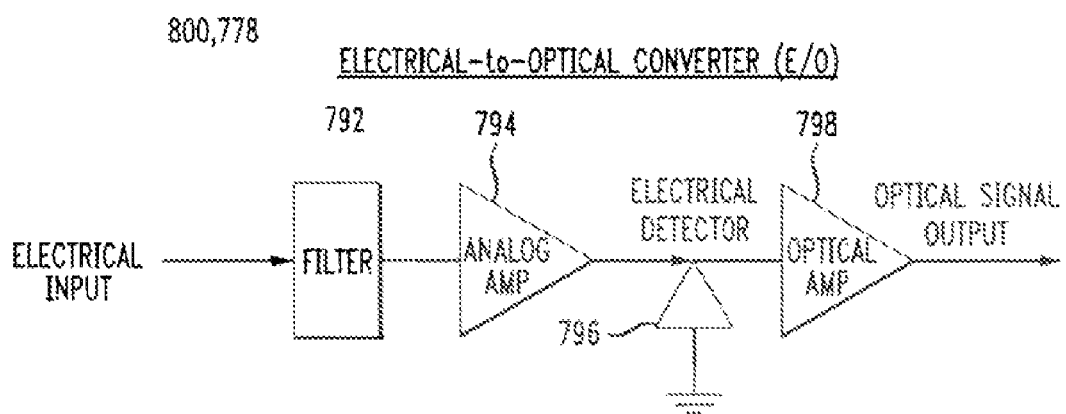
FIG. 10B shows a block diagram of an electrical-to-optical converter.

The output of an optical coupler 714 is preferably coupled to the revertive hitless switch 715 shown in FIG. 9. The modulated optical signal is preferably received by an optical hybrid 716 in an electrical/optical hybrid 718, where the signal is split. One-half of the optical signal is preferably routed to a switch 720 and the output of the switch 720 is sent to an optical transceiver preferably located outdoors (not shown). The other portion of the optical signal is preferably coupled to an electrical/optical converter 722, which converts the optical signal to an electrical signal. The electrical signal is provided to a switch 724 and the switch 724 preferably routes the signal to an outdoor electrical transceiver where it remains on standby.

In the receive mode, the optical signal from the remote site is received by the outdoor optical transceiver. The optical signal is transported down to the optical switch 720. The switch 720 preferably routes the optical signal to the optical hybrid 716, and the signal, is in turn sent to a demodulator in the modem 700 where the original data is recovered and passed to a processor (not shown) for further processing. Some of the received optical signal is preferably coupled out and detected by an optical detector 726. The detected output is preferably amplified by amplifier 728 and compared with the break-point reference threshold 730 in comparator 732.

As long as the threshold 730 is lower than the received signal voltage, the output of comparator 732 remains high and the output of comparator 734 is high. These levels cause /Q of flip-flop 736 and Q of Flip-flop 738 to be high, the output of AND Gate to be high, and the switch 720 to remain in position 2 (the optical mode).

If, for instance, fog rolls in, the CNR starts to degrade. When the received signal voltage at comparator 732 falls below the break-point reference voltage 730, the outputs of comparators 732 and 734 go low, /Q of flip-flop 736 and Q of flip-flop 738 are low, the output of AND Gate 740 is low, and switch 720 switches to position 3. The optical signal is then directed to the electrical/optical converter 722, which converts the optical signal to an electrical signal, and the switch 724 routes the electrical signal to the outdoor radio transceiver (not shown). Thus, even though an optical signal is input, an electrical signal is transmitted to mitigate fog.

The switch 724 preferably routes a received electrical signal to the electrical/optical converter 722, where the electrical signal is converted to an optical signal. The converter output is preferably provided to the optical hybrid 716, after which it is passed to the demodulator in the modem 700 for demodulation, and to a processor (not shown) for further processing. A coupler preferably couples some of the received signal to an optical detector 726. The detected output is preferably amplified and compared with a breakpoint reference threshold. If the received signal voltage is higher than the breakpoint reference threshold, the output of a comparator 732 is high. The output of comparator 732 is input to comparator 734, which causes the output of comparator 734 to be high. A Q output of flip-flop 738 is high and a Q output of flip-flop 736 is high, which causes the output of AND Gate 740 to be high and switch 720 to return to position 2, the default operation mode. An oscillator 742 preferably provides a clock signal that controls the switches, ensures system synchronization, and eliminates errors or data loss during the switching operation.

Similarly, in the electrical mode of operation shown in FIG. 7, the electrical and telemetry signals 744 are preferably injected into an electrical input for transmission. A diplexer 746 is preferably a dual filter that isolates the electronic transmit and receive paths. The transmitted signal is preferably amplified in amplifier 748, and fed to a mixer 750 where the signal is modulated. The modulated signal is preferably filtered and undergoes further amplification in a filter/amplifier 752. A diplexer 754 preferably provides further filtering, and the resulting modulated signal is preferably coupled to the revertive hitless switch 715 shown in FIG. 9.

In the revertive switch 715, the modulated electrical signal is preferably split in an electrical hybrid 745. The split signal is preferably connected to the switch 724, which routes the modulated signal to the electrical transceiver (not shown). The remaining half of the modulated signal preferably feeds the electrical/optical converter 722, in which the modulated signal is converted to an optical signal. The optical signal is preferably routed by switch 720 to the outdoor optical transceiver (not shown) where it is retained in standby.

In the receive operation, the outdoor transceiver (not shown) preferably receives the electrical signal and, after adaptation and frequency translation, transports the resulting signal to the switch 724 in the revertive hitless switch 715. The signal is preferably routed to the electrical hybrid 745, and then to a demodulator in the modem 700. The output of the demodulator is preferably provided to the processor (not shown) for further processing. A portion of the received signal is preferably coupled out and applied to an electrical detector 756. The detected signal is preferably amplified by amplifier 758 and comparator 760 compares the detected signal voltage with the break-point reference voltage 730. As long as the received signal voltage is greater than the break-point reference voltage 730, the device preferably remains in the default mode.

It should be noted that both the electrical mode and the optical mode include both a default mode and a hybrid mode. In the default mode, the electrical communication path is used in the electrical mode and the optical communication path is used in the optical mode. In the hybrid mode, at least a portion of the electrical communication path is used in the optical mode and at least a portion of the optical communication path is used in the electrical mode.

If, for instance, heavy rain begins and the CNR starts to degrade, the received signal voltage will start to decrease. If the received signal voltage falls below the break-point reference voltage, the output of comparator 760 changes state from high to low. The Q output of flip-flop 762 and the Q output of flip-flop 764 change go low, and the output of AND Gate 766 goes low. The switch 724 then moves to position 2, and the electrical signal is routed to the electrical/optical converter 722 where the electrical signal is converted to an optical signal. The optical signal is then sent to switch 720, which routes the optical signal to the outdoor optical transceiver (not shown) for transmission.

Since rain does not adversely affect the optical signal, the received signal voltage will begin to rise as the CNR improves. This improvement in CNR will continue until the impairment vanishes. If the received signal voltage rises above the clear weather threshold reference, the outputs of comparators 760 and 768, the Q outputs of flip-flops 762 and 764, and the output of the AND Gate 766 will again be high, which will direct switch 724 back to position 3, the default operation mode. As indicated above, the oscillator 742 preferably provides the clock signal that controls the switches, ensures system synchronization, and eliminates errors or data loss during the switching operation.

As shown in FIG. 9, the hybrid modem system formed in accordance with the present invention includes the modem 700 and the revertive hitless switch 715. Monitoring circuits, which include comparators 730, 734, 760, 768, flip-flops 736, 738, 762, 764, detectors 726, 756, and amplifiers 728, 758 are preferably incorporated in the revertive hitless switch 715 formed in accordance with the present invention though not shown in FIG. 7.

The hybrid FSOC/radio modem 700 shown in FIG. 7 preferably includes an optical interface for the optical signal input, and an electrical interface for the radio signal input. The optical interface preferably includes the optical switch 704, which routes the optical signal to/from the ON/OFF modulators 708, 768, in which the optical signal is directly modulated (transmit mode) or demodulated (receive mode). The optical coupler 714 couples the modulated optical signal to the revertive switch 715 shown in FIG. 9, which routes the optical signal to the optical transceiver (not shown) for transmission or routes the optical signal to the optical-to-electrical converter 722 where the optical signal is converted to an electrical signal.

The signal may be PSK or QAM modulated (transmit mode) or demodulated (receive mode) by the mixers 712, 770. Alternative modulation schemes that are well known in the art may also be employed while remaining within the scope of the present invention. The output of the mixer 712 is preferably converted back to an optical signal in an electrical/optical converter 800. The optical coupler 714 preferably couples the modulated optical signal to the revertive hitless switch 715. The revertive hitless switch 715 preferably routes the optical signal to the optical transceiver for transmission.

In the receive operation, the operation is substantially reversed. The optical signal is first converted to an electrical signal by electrical/optical converter 778. The electrical signal is then preferably amplified and demodulated by mixer 770. The demodulated signal is converted back to an optical signal by electrical/optical converter 780. An opto coupler 782 couples the optical signal to the optic switch 704, which preferably routes the optical signal to the processor (not shown) for further processing.

The electrical interface preferably includes an input diplexer 746 that isolates the transmit and receive paths, radio frequency amplifiers 748, 774, mixers 750, 772, filter/amplifiers 752, 776, and the output diplexer 754. In the transmit operation, the electrical signal 744 is preferably injected into the electrical port. The electrical signal is amplified by the amplifier 748 and modulated in accordance with either an ON/OFF key, PSK, or QAM modulation by the mixer 750.

The output of the diplexer 754 is preferably applied to the revertive hitless switch 715 shown in FIG. 9. The switch 724 preferably routes the electrical signal to the electrical transceiver. The reverse operation essentially takes place during reception, that is, the signal is demodulated, and the output of the diplexer is sent to the processor (not shown) for further processing.

The monitor circuit monitors the channel for CNR conditions and makes a decision to switch to that interface, optical or electrical, which has a better CNR performance. There are preferably at least four monitoring points monitor1-monitor4 that are provided to a central office. Voltage readings at these monitoring points provide an indication of the climatic conditions of the channel. The monitoring circuit preferably includes the optical detector 726, electrical detector 756, amplifiers 728, 758, comparators 732, 734, 760, 768, flip flops 736, 738, 762, 764, oscillator 742, a one-shot circuit 784, and AND gates 740, 766.

The oscillator 742 and one-shot circuit 784 preferably provide timing signals to maintain system synchronization and error free switching. The graphs in FIGS. 8A and 8B plot the break-point reference voltage and the clear weather reference voltage as a function of CNR in the electrical mode (FIG. 8A) and the optical mode (FIG. 8B).

Figure 8A:
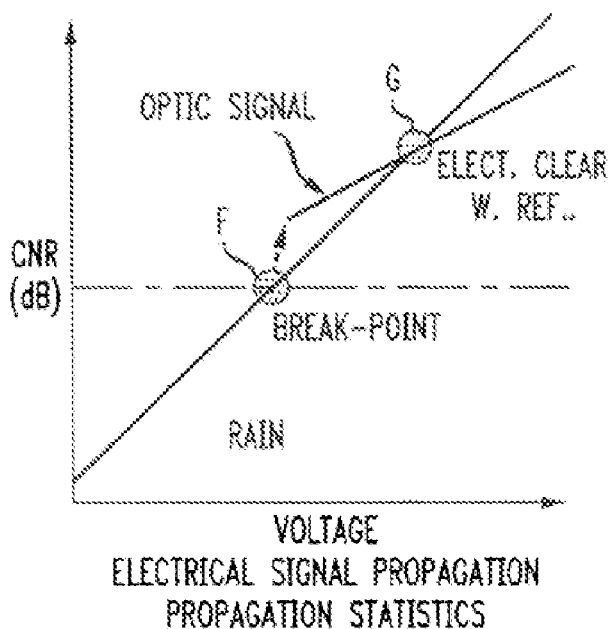
FIG. 8A is a graph showing a break-point reference voltage and a clear weather reference voltage as a function of carrier noise ratio (CNR) for an electrical mode in accordance with the present invention.

FIG. 8A shows that at point F, with the system in the electrical mode, the CNR has degraded and fallen below the break-point voltage, which may be due to heavy rain. In this case, switch 724 shown in FIG. 9, is moved to position 2, that is hybrid mode, and the system switches the electrical signal through at least a portion of the optical communication path. The electrical signal travels from switch 724 to electrical/optical converter 722 where it is sent to the electrical hybrid 745, and then to the modem 700. The CNR rises due to the improved optical signal performance in rain. If the CNR increases to point G in FIG. 8A, the system preferably reverts to the default mode, and the switch 724 is switched back to position 3.

Figure 8B:
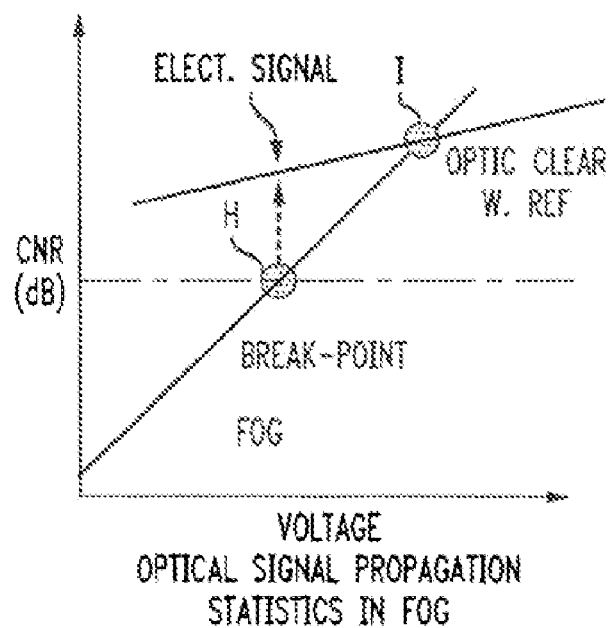
FIG. 8B is a graph showing a break-point reference voltage and a clear weather reference voltage as a function of carrier noise ratio (CNR) for an optical mode in accordance with the present invention.

Similarly, at point H in FIG. 8B, the system preferably switches the optical signal through at least a portion of the electrical path. Switch 720 in FIG. 9 is in hybrid mode in position 3 and switch 724 is in hybrid mode in position 2. The received radio signal is preferably directed to the electrical/optical converter 722 where the radio signal is converted to an optical signal. At point I in FIG. 8B, the system preferably reverts to default mode, in which switch 720 is in position 2 and switch 724 is in position 3.

The revertive hitless switch preferably includes the electro optical hybrid 718, electrical/optical converter, and the monitor circuits. A portion of the optical signal from the optical hybrid 716 is directed to the switch 720, and the remaining portion is provided to the electrical/optical converter 722, where it is converted to an electrical signal. The resulting electrical signal is sent to switch 724, which routes the signal to the outdoor transceiver (not shown).

The electrical hybrid 745 is another component in the revertive switch 715 that splits the electrical signal. A portion of the split signal is provided to the switch 724 and the remaining portion is provided to the electrical/optical converter 722, which converts the electrical signal to an optical signal. The resulting signal is preferably routed to the optical transceiver. The revertive switch 715, under the control of the monitor circuits, monitors the CNR of the environment, in which the system operates.

As shown in FIG. 10A, the optical-to-electrical converter 710, 780 preferably includes an optical detector diode 786, analog filter 788, and analog amplifier 790. In the optical mode of operation, the transmitted optical signal is sent to the optical diode detector 786, which converts the optical signal to an electrical signal. The electrical signal is then filtered and amplified to the desired level. As shown in FIG. 7, the output signal is sent to the mixer 712 for modulation, which can include PSK, QAM, or other modulation schemes.

Current technology predominantly uses ON/OFF Keying modulation. After modulation is performed, the modulated signal is applied to the electrical-to-optical converter 800 shown in FIG. 7 where it is converted back to an optical signal for transmission. The converters 800, 778 preferably include a filter 792, amplifier 794, electrical detector 796, and optical amplifier 798.

During optical signal reception, the optical signal is preferably converted to an electrical signal, demodulated, and converted back to an optical signal. The resulting optical signal is sent to the processor (not shown) for further processing. In the electrical mode of operation, the electrical signal is preferably sent to the modulator without conversion. During reception, the electrical signal is preferably sent without conversion to the demodulator. The demodulated signal is then provided to the processor (not shown) for further processing.

As shown in FIG. 7, in the optical mode, the unmodulated optical signal plus the telemetry signal 702 are injected into the optical input for transmission. The optical switch 704 routes the optical signal to the ON/OFF switch 708 for ON/OFF keying modulation or to optical-to-electrical converter 710 and the mixer 712, where the resultant electrical signal is PSK or QAM modulated. Alternative modulation schemes are also intended to be within the scope of the present invention.

The output of the optical coupler 714 is preferably coupled to the revertive hitless switch 715 shown in FIG. 9. The modulated optical signal is preferably received by the optical hybrid 716 in the electrical/optical hybrid 718, where the signal is split. A portion of the signal is coupled to switch 720 and the output of switch 720 is ultimately provided to the optical transceiver (not shown). The remaining portion of split optical signal is preferably coupled to the electrical/optical converter 722, which converts the optical signal to an electrical signal. The electrical signal is preferably provided to switch 724, which routes the signal to the electrical transceiver (not shown) where it remains on standby.

In the receive mode, the optical signal from a remote site is preferably received by the optical transceiver (not shown). The received optical signal is provided to the optical switch 720. The switch 720 then preferably routes the optical signal to the optical hybrid 716, and the signal is sent to the demodulator in the modem 700 where the original data is recovered and passed to the processor (not shown) for further processing. A portion of the received optical signal is preferably coupled out and detected by the optical detector 726. The detected output is preferably amplified by amplifier 728 and compared with the break-point reference threshold 730 in comparator 732. As long as the break-point reference threshold is lower than the received signal voltage, the output of the comparator 732 remains high. Assuming the output of comparator 734 is high, the Q outputs of flip-flops 736 and 738 are high, and the output of AND gate 740 is high, the switch remains in position2, which is the default mode.

If fog begins to form, the CNR starts to degrade. When the received signal voltage at comparator 732 falls below the break-point reference voltage, the outputs of comparators 732 and 734 go low, the Q outputs of flip-flops 736 and 738 go low, the output of AND gate 740 goes low, and switch 720 switches to position 3, the hybrid mode. In this mode the optical signal is preferably sent to the electrical/optical converter 722, which converts the optical signal to an electrical signal, and the switch 724 routes the electrical signal to the radio transceiver (not shown).

Though the input signals are optical signals, the over-the-air transmission is electrical to mitigate fog. Switch 724 routes the received electrical signal to the electrical/optical converter 722, where the electrical signal is converted to an optical signal. The output of the converter 722 is preferably sent to the optical hybrid 716. The resulting optical signal is passed to the demodulator in the modem 700 for demodulation, and then to the processor (not shown) for further processing.

The coupler preferably couples some of the received optical signal to the optical detector 726. The detected output is amplified and compared with the break-point reference voltage 730. If the received signal voltage is lower than the breakpoint reference voltage 730, the output of comparators 732, 734 is low, the Q outputs of flip-flops 736, 738 are low, the AND gate is low, and switch 720 is in position 3, the hybrid mode. When the detected output becomes greater than the clear-weather threshold, switch 720 returns to position 2, the default mode. The oscillator 742 preferably provides the clock signal that controls the switches, ensures system synchronization, and eliminates errors and data loss during the switching operation.

Similarly, in the electrical mode of operation, the electrical signal and the telemetry signal 744 are preferably injected into the electrical input. The diplexer 746 is preferably a dual filter that isolates the transmit and receive paths. The transmitted signal is preferably amplified by amplifier 748 and fed to the mixer 750 where the signals are modulated. The modulated signal is filtered and further amplified by filter/amplifier 752.

The diplexer 754 provides further filtering and the resulting modulated signal is provided to the revertive hitless switch 715 shown in FIG. 9. In the switch 715, the modulated signal is split in the electrical hybrid 745. A portion of the signal is connected to switch 724, which routes the modulated signal to the electrical transceiver (not shown). The remaining portion of the modulated signal preferably feeds the electrical/optical converter 722 where the modulated signal is converted to an optical signal. The optical signal is then routed by switch 720 to the optical transceiver (not shown) where it is held in standby.

In the receive operation, the electrical transceiver preferably receives the electrical signal after adaptation and frequency translation, and transport the resulting signal to switch 724 in the revertive hitless switch 715. The signal is routed to the electrical hybrid 745, and then to the demodulator in the modem 700. The output of the demodulator is sent to the processor (not shown) for further processing.

A portion of the received signal is preferably coupled out and detected by electrical detector 756. The detected signal is amplified by amplifier 758 and comparator 760 compares the received signal voltage with the break-point reference voltage. As long as the received signal voltage is greater than the breakpoint reference voltage 730, the operation will remain in the default mode. That is, the outputs of comparators 760, 768 are high, the Q outputs of flip-flops 762, 764 are high, the output of AND gate 766 is high, and switch 724 is in position 3.

If, for instance, heavy rain starts to fall, the CNR will degrade and the received signal voltage decreases. If the received voltage falls below the break-point reference voltage 730, the output of comparator 760 changes state from high to low, the Q outputs of flip-flops 762, 764 change state from high to low, the output of the AND 766 goes low, and switch 724 moves to position 2 in hybrid mode. The electrical signal is then routed to the electrical/optical converter 722 where the electrical signal is converted to an optical signal. The optical signal is sent to switch 720, which routes the optical signal to the optical transceiver (not shown) for transmission.

Since rain does not adversely affect optical signal performance, the received signal voltage will begin to rise as the CNR improves. This improvement in CNR will continue until the impairment vanishes. If the received signal voltage rises above the clear weather threshold reference, the output of comparators 760, 768 go high, the outputs of flip-flops 762, 764 go high, the output of AND gate 766 goes high, and switch 724 switches back to position 3, the default operation mode.

Embodiments of the invention as described above are intended for use in, for instance, point-to-point, point-to-multipoint, mesh, and star system configurations. The comparators 732, 734, 760, 768 may be implemented by combinatorial gates, such as one or more AND gates.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of increasing reliability of a communication system comprising:
   comparing a value of a characteristic associated with an optical receive signal to a first threshold value, the optical receive signal being received following exposure to climatic conditions;
   comparing a value of a characteristic associated with an electrical receive signal to a second threshold value, the electrical receive signal being received following exposure to climatic conditions;
   transmitting an input signal to a first signal path and a second signal path;
   coupling operatively the first signal path to an optical switch associated with an optical path, the optical path being configured to output an optical output signal based on the input signal;
   coupling operatively the second signal path to electrical switch associated with an electrical path, the electrical path being configured to output an electrical output signal based on the input signal;
   controlling, without user intervention, the optical switch based on a result of comparing the value of the characteristic associated with the electrical receive signal to the second threshold value using a second control circuit; and
   controlling, without user intervention, the electrical switch based on a result of comparing the value of the characteristic associated with the optical receive signal to the first threshold value using a first control circuit.

2. A method of increasing reliability of a communication system defined by claim 1, wherein the value of the optical characteristic associated with the optical receive signal depends on a climatic condition.

3. A method of increasing reliability of a communication system defined by claim 1, further comprising directing the input signal through the optical path without user intervention as a result of a decrease in fog.

4. A method of increasing reliability of a communication system defined by claim 1, further comprising directing the input signal through the electrical path without user intervention as a result of a decrease in rain.

5. A method of increasing reliability of a communication system defined by claim 1, further comprising directing the input signal through the electrical path without user intervention as a result of an increase in fog.

6. A method of increasing reliability of a communication system defined by claim 1, further comprising directing the input signal through the optical path without user intervention as a result of an increase in rain.

7. A method of increasing reliability of a communication system defined by claim 1, wherein the characteristic associated with the received signal comprises a carrier-to-noise ratio (CNR).

8. A communication system comprising:
   an optical communication path comprising:
      an optical switch operatively coupled to an optical transceiver, the optical switch being controlled to connect the optical transceiver to the optical communication path or to a first hybrid optical-radio communication path, the optical switch receiving an optical receive signal from the optical transceiver,
      an optical modulator/demodulator for demodulating the optical receive signal when the optical switch is connected to the optical communication path,
      a first control circuit coupled to the optical receive signal by a first coupler after demodulation of the optical receive signal, the first control circuit including a first comparator adapted to compare a value of an optical characteristic associated with the optical receive signal to a first threshold value, the optical receive signal being exposed to climatic conditions before receipt; and
   a electrical communication path comprising:
      an electrical switch operatively coupled to a radio transceiver, the electrical switch being controlled to connect the radio transceiver to the electrical communication path or to a second hybrid optical-radio communication path,
      an electrical modulator/demodulator for demodulating an electrical receive signal when the electric switch is connected to the electrical communication path,
      a second control circuit coupled to the electrical receive signal by a second coupler after demodulation of the electrical receive signal, the second control circuit including a second comparator adapted to compare a value of an electrical characteristic associated with the electrical receive signal to a second threshold value,
   wherein the first control circuit of the optical communication path generates a first control signal that is sent to the electrical switch of the electrical communication path to control whether the electrical switch connects the radio transceiver to the electrical communication path or the second hybrid optical-radio communication path and the second control circuit generates a second control signal that is sent to the optical switch to control whether the optical switch connects the optical transceiver to the optical communication path or to the first hybrid optical-radio communication path.

9. A communication system defined by claim 8, wherein the value of the optical characteristic associated with the optical receive signal depends on a climatic condition.

10. A communication system defined by claim 8, wherein the optical switch is adapted to direct the optical transmit signal or the electrical transmit signal to the optical transceiver without user intervention as a result of a decrease in fog.

11. A communication system defined by claim 8, wherein the electrical switch is adapted to direct the electrical transmit signal or the optical transmit signal to the radio transceiver without user intervention as a result of a decrease in rain.

12. A communication system defined by claim 8, wherein the electrical switch is adapted to direct the electrical transmit signal or the optical transmit signal to the radio transceiver without user intervention as a result of an increase in fog.

13. A communication system defined by claim 8, wherein the optical switch is adapted to direct the optical transmit signal or the electrical transmit signal to the optical transceiver without user intervention as a result of an increase in rain.

14. A communication system defined by claim 8, wherein the characteristic associated with the optical receive signal comprises a carrier-to-noise ratio (CNR).

* * * * *